United States Patent [19]

Tuetey

[11] 3,975,962

[45] Aug. 24, 1976

[54] CLICK WORK FOR A WATCH MOVEMENT

[75] Inventor: Paul Albert Tuetey, Le Locle, Switzerland

[73] Assignee: Les Fabriques d'Assortiments Reunies, Le Locle, Switzerland

[22] Filed: Aug. 13, 1975

[21] Appl. No.: 604,237

[52] U.S. Cl. ............................... 74/1.5; 58/116 R
[51] Int. Cl.² .................... F16H 27/00; G04B 15/00
[58] Field of Search .............. 58/116 R, 117–121 R, 58/26 R, 28 R–28 D; 74/1.5

[56] References Cited
UNITED STATES PATENTS

| 637,179 | 11/1899 | Stockall | 58/26 R |
| 2,385,011 | 9/1945 | Lurtz | 58/117 |
| 3,168,833 | 2/1965 | Popovitch | 58/117 X |
| 3,504,206 | 3/1970 | Fritsch | 58/116 R X |

Primary Examiner—Ulysses Weldon
Attorney, Agent, or Firm—Karl F. Ross; Herbert Dubno

[57] ABSTRACT

In an electric timepiece an electric motor continuously rotates a disk carrying an eccentric pin that is engageable inside a heart-shaped opening formed in an actuating member carrying a pair of pallet pins engageable with and between the teeth on opposite sides of an escape wheel. This member is carried on a pair of spring-steel arms integrally formed with the actuating member and serving to urge the member into one end position. An abutment formed on the member is engageable against the periphery of the drive disk to prevent accidental stepping of the escape wheel except when the eccentric pin engages the cam and a notch formed on the disk aligns with this abutment.

10 Claims, 3 Drawing Figures

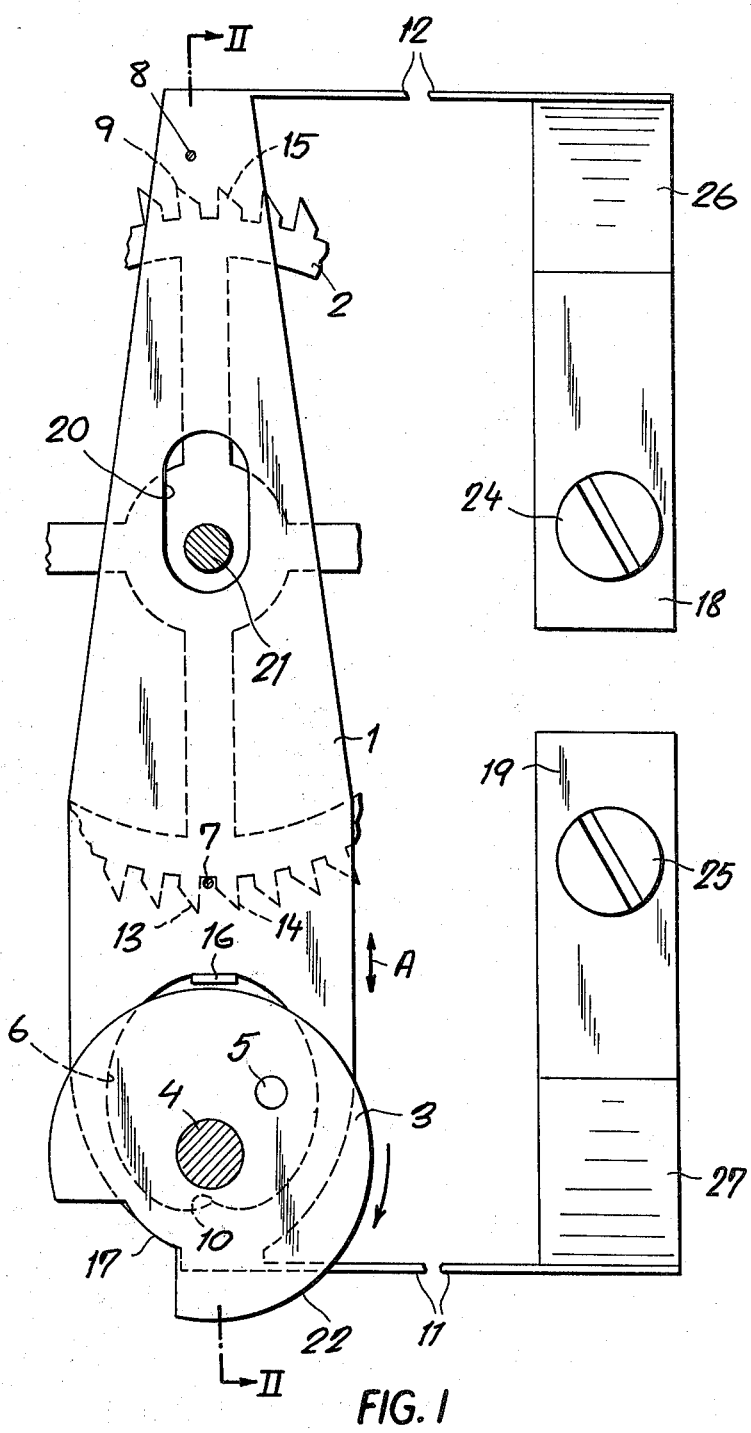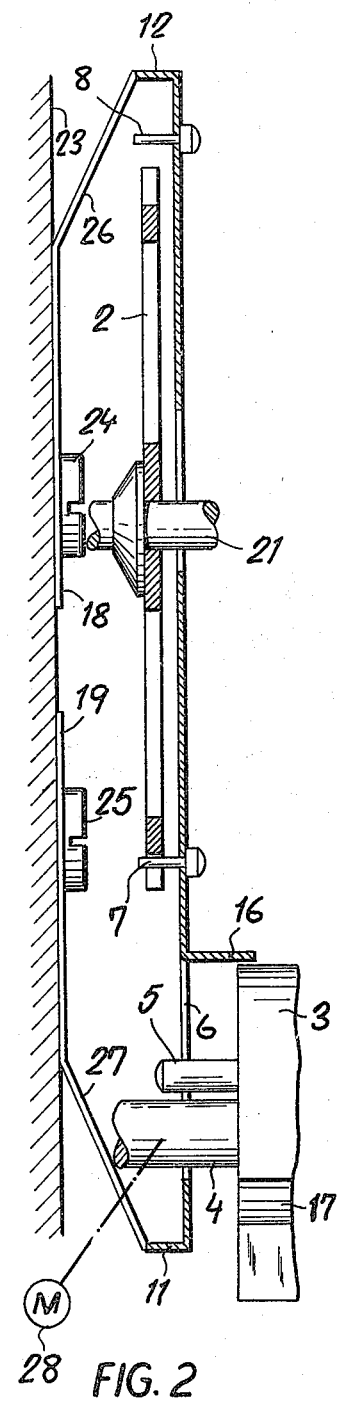
FIG. 1
FIG. 2

CLICK WORK FOR A WATCH MOVEMENT

FIELD OF THE INVENTION

The present invention relates to an escapement mechanism for a timepiece. More particularly this invention concerns such a mechanism usable in an electrically powered wrist watch.

BACKGROUND OF THE INVENTION

One of the most common types of escapement mechanisms using a movable-frame motor is the so-called inverted-anchor type. In such an arrangement two principal difficulties are encountered which are not normally seen in normal anchor-type escapements. First of all gravity cannot be relied on to hold the anchor in a particular position so that means must be provided to do this. In addition it is possible for the escape wheel to make false steps, that is moving a half step forward then a half step backward rather than a full step forward on each rocking of the anchor. This false-stepping frequently occurs when the watch is subjected to a shock at the stepping instant as for example when the date changes or the user makes a brusque movement.

It has been suggested to overcome the first-mentioned difficulty by providing a small permanent magnet in the watch which holds the anchor in either of its positions with a pallet engaged between the teeth of the escape wheel. The second problem has been overcome by using a unidirectional spring-type clutch on the escape wheel. It has also been suggested to use an escapement with movable pallets which are displaceable in a plane parallel to the plane of the anchor, their displacement being limited by appropriate means so as to hold the escapement wheel even during the stepping operation.

Another system is known wherein a movable bar carrying two pin-type pallets is used to operate the escape wheel. The bar is reciprocated back and forth by an arm, each movement of the arm moving the escape wheel by a single step. Such an arrangement cannot be driven by a balanced motor, a rotating motor, or an oscillating motor in a timepiece. In addition such a system is relatively sensitive to shocks so as to be almost useless in a portable timepiece. See U.S. Pat. No. 637,179.

It is also possible to operate the above-mentioned bar with a cam as is employed in some self-winding mechanisms. See Swiss Pat. No. 342,302. In such systems, however, the driving cam always remains in contact with the edge of the opening that it cooperates with so that the escapement is always in contact with the drive motor. Such contact destroys the isochronism of the watch and therefore is only employable in timepieces not expected to have a high degree of accuracy. When a rotating or oscillating motor is used the rubbing cam gives relatively poor results.

OBJECTS OF THE INVENTION

It is therefore an object of the present invention to provide an improved timepiece escapement mechanism.

Another object is the provision of such a mechanism which is not subject to false stepping and which is inexpensive to manufacture.

SUMMARY OF THE INVENTION

The above and other objects are attained in an escapement mechanism having an escape wheel with a multiplicity of radially extending and angularly equispaced teeth. A drive disk is rotatable about an axis generally parallel to the axis of the wheel and is provided with an eccentric pin parallel to these axes. This disk also has a periphery formed with a radially open notch. An actuating member is formed with an abutment engageable in the notch and against the periphery and with a cam opening receiving the pin and engageable with this pin. This member has a pair of pallets and is reciprocal in a substantially straight line adjacent the escape wheel between one position with one of the pallets engaging between two of the teeth on one side of the wheel and another position with the other pallet engaging between another two teeth on the opposite side of the wheel. A spring is provided for normally urging this actuating member into the one position. Means is also provided for rotating the disk between a first angular position corresponding to the one position of the member with the abutment at the periphery outside the notch and the pin out of engagement with the cam opening and a second angular position corresponding to the other position of the member with the abutment in the notch and the pin engaging the opening.

In accordance with the present invention each tooth has an inclined surface so that as the actuating member is moved from position to position the radially inwardly moving pallet pin on the actuating member will ride against the inclined surface and cam the escape wheel around by one-half on an angular step.

According to yet another feature of this invention the actuating member is made of a very thin piece of sheet metal, preferably of stainless steel, and is unitarily formed with a pair of mounting arms that act as the restoring springs. Such a construction can be made at extremely low cost and has a very long service life.

In accordance with yet another feature of this invention the actuating disk is mounted on a small rotary motor and its periphery outside the notch is circular and centered on the drive axis of the motor. The abutment on the disk is formed as a bentover tab at the edge of the camming hole.

The escapement mechanism according to the present invention is extremely rugged and inexpensive to manufacture. It is not subject to false stepping because of the interaction of the abutment and the periphery of the drive disk, yet operates surely without the necessity of providing any extra holding means for the escape wheel or the pallet pins. It can be employed both in a conventional clock, or in a wrist watch.

BRIEF DESCRIPTION OF THE DRAWING

The above and other objects, features, and advantages will become more readily apparent from the following, reference being made to the accompanying drawing in which:

FIG. 1 is a top view of the escapement according to the present invention;

FIG. 2 is a section taken along line II—II of FIG. 1, and

SPECIFIC DESCRIPTION

Figure 3:
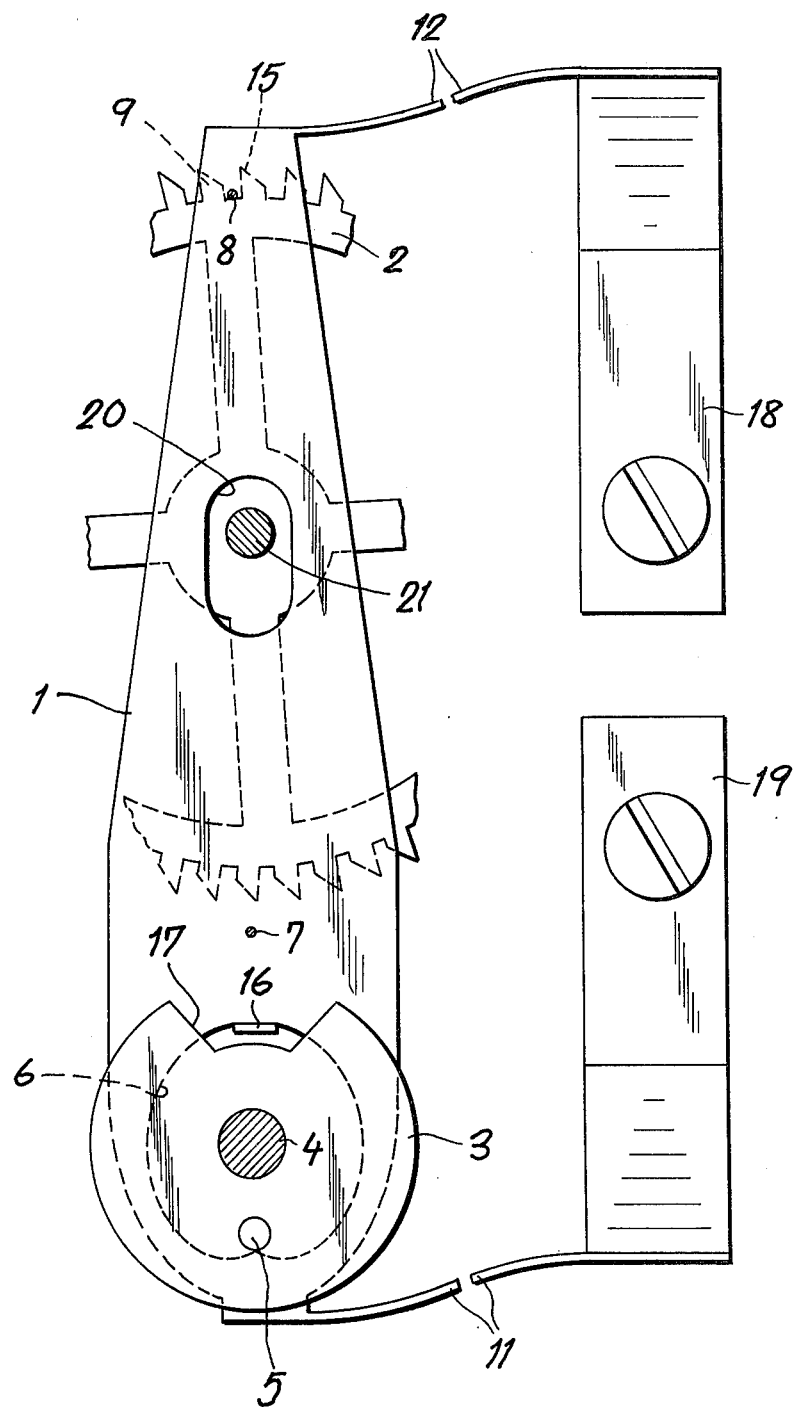
FIG. 3 is a view similar to FIG. 1 illustrating the mechanism in another position.

The timepiece according to the present invention has a casing 23 (FIG. 2) on which is mounted an actuating member 1, an escape wheel 2, and a drive disk 3. A motor 28 is connected to the shaft 4 of the disk 3 which also carries an eccentric pin 5 extending downwardly from the disk 3 toward the casing 23. The actuating member 1 is formed with a heart-shaped cam hole 6 and is provided with a pair of pallet pins 7 and 8 extending toward the casing 23 parallel to the shaft 4. In addition the actuating member 1 is provided with a bent-up abutment tab 6 engageable with and normally spaced slightly from the periphery 22 of the disk 3. A radially outwardly open notch 17 is formed on the disk 3 at its side diametrically opposite the pin 5.

The wheel 2 is mounted on a pin 21 carrying the pinions connected to the gear works of the timepiece. This pin 21 passes through an elongated cutout 20 in the member 1. The actuating member 1 normally lies in the position illustrated in FIG. 1 and is held in this position by means of springs 11 and 12 formed as bentover arms extending from the ends of the elongated member 1 so as to permit it to reciprocate in the direction of arrow A. Screws 24 and 25 anchor end portions 18 and 19 connected via inclined parts 26 and 27 to the springs 12 and 11. Thus the element 1, the springs 11 and 12, the end portions 18 and 19, and the inclined portions 26 and 27 are all integrally formed. The material used for them is very thin and supple stainless steel.

The mechanism according to the present invention functions as follows:

The motor 28 is operated to rotate the disk 3 at a constant speed of one revolution per second, with the pin 5 orbiting in a clockwise direction seen in FIGS. 1 and 2.

To start with the pallet pin 7 is engaged between a pair of teeth 13 and 14 on one side of the wheel and the other pallet pin 8 is spaced from the wheel. As the pin 5 orbits clockwise it comes into contact with the inside edge of the cam hole 6. Before this pin 5 starts to move the element 1 out of the position of FIG. 1 the notch 17 aligns with the abutment tab 16.

Continued rotation of the disk 3 then displaces the member 1 out of the position of FIG. 1, pulling the tab 16 into the notch 17 and pulling the pallet pin 7 out from between the teeth 13 and 14. At the same time the pallet pin 8 is pulled down against the inclined surface of the opposite pin 9 in back of the pin 15 of the wheel 2 so as to rotate this wheel counterclockwise by a distance equal to half the angular spacing between a pair of teeth on the wheel 2. This is illustrated in FIG. 3.

After the pin 5 passes the point 10 in the cam 6 opposite the tab 16, the member 1 is allowed to move back from the position of FIG. 3 to the position of FIG. 1. This movement causes the pin 8 to move out from between the teeth 9 and 15 and brings the pin 7 down on to the inclined surface of the tooth 13 so as again to rotate the wheel 2 counterclockwise by a half step. As soon as the pin 5 pulls out of contact with the periphery of the cam 6, which happens when the springs 11 and 12 have returned it to its rest position, the periphery 22 of the disk 3 is again in front of the abutment 16.

In this manner the member 1 reciprocates back and forth once each second, rotating the wheel 2 through an angular distance equal to the spacing between two adjacent teeth.

In addition it should be noted that a shock to the escapement will not be able to knock the pallets 7 and 8 loose from the teeth of the wheel 2 when the pin 5 is out of contact with the edge of the cam 6 since the member 1 is unable to move far enough to disengage the pallet 7 before this tab 16 will come against the periphery 22. When the pin 5 is against the cam 6 and the notch 17 is in line with the tab 16, however, a shock is similarly ineffective as all that will do is speed up the stepping action slightly.

Although the system is shown here using a motor 28 which rotates continuously at a speed of one revolution per second, it is possible to use a motor which oscillates back and forth through 180° or less, or even to employ mechanical windup mechanism.

I claim:

1. An escapement mechanism for a timepiece, said mechanism comprising:
   an escape wheel having a multiplicity of radially extending and angularly equispaced teeth and rotatable about a wheel axis;
   a drive disk rotatable about a drive axis generally parallel to said wheel axis and provided with an eccentric pin parallel to said drive axis, said disk having a periphery formed with a radially open notch;
   an actuating member formed with an abutment engageable in said notch and against said periphery and with a cam opening receiving said pin and engageable therewith, said member having a pair of pallets and being reciprocal in a substantially straight line adjacent said wheel between one position with one of said pallets engaging between two of said teeth on one side of said wheel and another position with the other pallet engaging between another two teeth on the opposite side of said wheel;
   spring means for normally urging said member into said one position; and
   means for rotating said disk between a first angular position corresponding to said one position of said member with said abutment at said periphery outside said notch and said pin out of engagement with said cam opening, and a second angular position corresponding to said other position of said member with said abutment in said notch and said pin engaging said opening.

2. The mechanism defined in claim 1 wherein said member is made of resilient sheet metal and said spring means includes at least one arm extending from said member and having an end secured to said timepiece.

3. The mechanism defined in claim 2 wherein said cam is heart-shaped.

4. The mechanism defined in claim 3 wherein said abutment is a tab at the edge of said cam bent up away from said member.

5. The mechanism defined in claim 4 wherein said member is generally planar and perpendicular to said axis.

6. The mechanism defined in claim 5 wherein in said one position said abutment is spaced slightly from said periphery.

7. The mechanism defined in claim 6 wherein said periphery is circular and centered on said drive axis.

8. The mechanism defined in claim 7 wherein said pin is diametrically opposite said notch relative to said drive axis.

9. The mechanism defined in claim 2 wherein said member and said spring means are all made integrally of a stainless-steel sheet.

10. The mechanism defined in claim 1 wherein said means for rotating is an electrical motor.

* * * * *